United States Patent [19]
Choe et al.

[11] Patent Number: 6,094,696
[45] Date of Patent: Jul. 25, 2000

[54] VIRTUAL SERIAL DATA TRANSFER MECHANISM

[75] Inventors: Gwangwoo Choe, Austin; Jim MacDonald, Buda, both of Tex.

[73] Assignee: Advanced Micro Devices, Inc., Sunnyvale, Calif.

[21] Appl. No.: 08/852,431

[22] Filed: May 7, 1997

[51] Int. Cl.[7] .................................................. G06F 15/16
[52] U.S. Cl. ............................. 710/57; 710/52; 710/30; 709/300
[58] Field of Search ................................. 395/877, 872, 395/200, 850, 680; 364/200, DIG. 1, DIG. 2; 710/57, 52, 30; 709/300

[56] References Cited

U.S. PATENT DOCUMENTS

| | | |
|---|---|---|
| 4,228,496 | 10/1980 | Katzman et al. . |
| 4,663,706 | 5/1987 | Allen et al. ............................. 364/200 |
| 5,687,396 | 11/1997 | Satoh et al. ............................. 395/872 |
| 5,740,468 | 4/1998 | Hirose ..................................... 395/877 |
| 5,784,649 | 7/1998 | Begur et al. ............................. 395/872 |

*Primary Examiner*—Thomas C. Lee
*Assistant Examiner*—Mohamed Mashaal
*Attorney, Agent, or Firm*—Conley, Rose & Tayon, PC; B. Noel Kivlin

[57] ABSTRACT

A plurality of data devices are interfaced to a microprocessor using a serial data transfer mechanism. The parallel data from the data devices is serialized. The serial data streams are multiplexed via a data multiplexer. An index signal identifies the data device from which the serial data is received/transmit. When a receive buffer is at a predefined level of emptiness, a bit associated with that buffer is asserted. Likewise, when a transmit buffer is at a predefined level of emptiness, a bit within the index register associated with the transmit buffer is asserted. The assertion of a bit within the index register generates an interrupt. A CPU core receives the interrupt signal and reads the index register to determine which buffers need servicing. The CPU core deasserts one bit of the index register, which indicates the CPU core is going to service the buffer associated with that bit. If the bit in the index register is associated with a receive buffer, the deassertion of the bit causes the receive buffer to output receive data to the CPU core. Likewise, if the bit deasserted by the CPU core is associated with the transmit buffer, the deassertion of the bit within the index register causes the transmit buffer to input data from the CPU core.

14 Claims, 5 Drawing Sheets

VIRTUAL SERIAL DATA TRANSFER MECHANISM

BACKGROUND OF THE INVENTION

1. Field of the Invention

This invention relates to data transfer mechanisms and more particularly to multiple-channel serial data transfer mechanisms.

2. Description of the Related Art

Computer architectures generally include a plurality of input/output devices interconnected by one or more various buses. For example, modern computer systems typically include a central processing unit (CPU) coupled through bus interface logic to a high bandwidth system bus, such as the peripheral component interconnect (PCI) bus. Examples of devices which may be coupled to the system bus include cameras, microphones, speakers and telephony devices.

Personal computer systems were originally developed for business applications such as word processing and spread sheets, among others. However, personal computer systems are currently being used to handle a number of real time applications including multimedia applications having video and audio components, video capture and playback, telephony applications, and speech recognition and synthesis, among others. These real time applications typically require a large amount of system resources and bandwidth. One problem that has arisen is that computer systems originally designed for business applications are not well suited for the real time requirements of modern multimedia applications. For example, modern personal computer system architectures still presume that the majority of applications executing on the computer system are non-real-time business applications such as word processing, which execute primarily on the main CPU. In general, computer systems have not traditionally been designed with multimedia hardware as part of the system, and thus the system is not optimized for multimedia applications. For example, multimedia devices such as cameras, microphones and speakers are typically connected via a system bus, such as a PCI bus, which is not designed for real time applications.

In many cases, the system bus does not have the required bandwidth, throughput or response time for multimedia transfers. For example, a multimedia hardware device situated on the PCI bus must first arbitrate for control of the PCI bus before the device can begin a data transfer or access to the system memory, which introduces bus latency that may be critical in real-time applications. For example, audio data sampled at 44.1 kHz stereo provides a data sample every 11 microseconds. In this example, the latency of the system bus must be less than 11 microseconds, which is difficult to achieve with an arbitrated system bus with many components situated on the bus. In addition, since the computer system architecture is not optimized for multimedia, multimedia hardware devices are generally required to share bus usage with non-real time devices, which can severely burden the bandwidth of the bus. For example, a system bus with two 8 kilohertz (kHz) telephony data inputs and one 44.1 kHz stereo audio input produce 1.5 Mbps, which can greatly burden a serial bus.

As multimedia applications become more prevalent, multimedia hardware will correspondingly become essential components in personal computer systems. Therefore, an improved data transfer mechanism is desired which is optimized for real time multimedia and communications applications as well as for non-real time applications. In addition, improved methods are desired for transferring real time data between a multimedia device and a processor.

SUMMARY OF THE INVENTION

The problems outlined above are in large part solved by a serial data transfer mechanism in accordance with the present invention. The present invention utilizes serial data communications to transfer a plurality of data streams to a CPU core or a memory space with minimal extra signal lines. Parallel data from the data devices are converted to serial data streams. The serial data streams are coupled to a data multiplexer. The data multiplexer alternately selects one of the plurality of serial data streams and outputs a continuous data stream on a receive bus. The data multiplexer effectively combines the data of several data devices into one continuous data stream. The data multiplexer also includes a receive index output that identifies the data device from which the current data on the receive bus originated. The data devices include a control signal output for requesting transmit data from the microprocessor. These control signals are coupled to the data multiplexer. The data multiplexer prioritizes the request for transmit data and outputs an index on a transmit index output identifying the desired transmit data. The index signals include a sufficient number of bits to represent the number of data input devices. For example, if four data devices are connected to the data multiplexer, the index signals may be two bits each. The interface between the data multiplexer and the processor also includes a clock line. Therefore, for four devices, the interface to the processor is seven signal lines (one receive bus, one transmit bus, one clock signal, two receive index lines, and two transmit index lines). Alternatively, if eight data devices are interfaced to the processor, three index lines are required for both the transmit and received index and thus a total of nine lines are required for the serial transmission interface.

A storage device includes a receive buffer and a transmit buffer for each data device. The receive index signal indicates to which of the plurality of received buffers to store the data on the receive bus. The transmit index indicates from which transmit buffer the data on the transmit bus is output. The receive buffers store the data from the data devices until a CPU core reads the receive data. By buffering the receive data, the response time in which the CPU core must access the receive data is reduced. The CPU core can wait until a block of receive data is stored in the buffer prior to reading the data. The response time of the CPU core is dictated by the depth of the receive buffer and the data rate at which the receive buffer is filled. The storage device also includes a plurality of transmit buffers. The transmit buffers store transmit data received from the CPU core. The transmit data stored in the transmit buffers is output to the data devices via the transmit bus. The rate at which the CPU core must store data to the transmit buffer is determined by the data rate at which data is output by a particular data device and the depth of the transmit buffer.

Each receive buffer and transmit buffer has an empty signal and a full signal associated with that buffer. In the case of a receive buffer, asserting the full signal indicates to the CPU core that receive data is available and should be downloaded. In the case of the transmit buffer, the empty signal indicates to the CPU core that the transmit buffer is partially empty and data should be uploaded.

A buffer management circuit contains an index register. The index register includes a flag bit for each transmit and receive buffer. When the receive buffer is full, a flag bit associated with a receive buffer is asserted. Likewise, when a transmit buffer is empty, a flag bit associated with the transmit buffer is asserted. In addition to setting a flag bit within the index register, a full signal or an empty signal also generates an interrupt.

When the CPU core receives an interrupt signal from the buffer management circuit, the CPU core reads the index register to determine which receive buffer and/or transmit buffer caused the interrupt. If multiple buffers require service, i.e. multiple receive buffers are full or multiple transmit buffers are empty, the CPU core prioritizes the buffers. The CPU core deasserts the flag bit of the buffer to be serviced. The deassertion of a flag bit within the index register causes the buffer management circuit to output address and control signals to access data to/from the buffer associated with the deasserted flag bit. If the buffer is a receive buffer, the address and control signals cause the buffer to output the receive data stored in the buffer to the CPU core. If the buffer associated with the deasserted flag bit is a transmit buffer, the address and control signals cause the transmit buffer to receive transmit data from the CPU core. After the CPU core has deasserted the flag bit, the CPU core prepares to either transmit or receive data from/to the buffer associated with a deasserted flag bit.

Broadly speaking, the present invention contemplates a data transfer system including: a buffer, a buffer management circuit and a microprocessor core. The buffer is configured to be coupled to a first input device and includes a first data buffer configured to store receive data from the first input device. The first data buffer includes a first signal configured to indicate a level of fullness of the first data buffer. The buffer management circuit is coupled to the buffer. The buffer management circuit includes an index register that includes a first flag bit. The buffer management circuit is configured to assert the first flag bit and to assert an interrupt signal when the first signal indicates the first buffer is at a predefined level of fullness. The microprocessor core is coupled to the buffer management circuit and is configured to receive the interrupt signal, to read the index register, to deassert the first flag bit, and to input the receive data stored in the first data buffer. The buffer management circuit is configured to provide an address signal and a control signal to the buffer in response to the deassertion of the first flag bit. The address signal and the control signal are configured to cause the first data buffer to output the receive data stored in the first data buffer.

The present invention further contemplates a method of transferring data between data devices and a processor comprising the steps of: receiving input data from a plurality of input devices; storing the input data in a plurality of input buffers; asserting a first full signal when a first of the plurality of input buffers achieves a predefined level of fullness; asserting a first flag bit of an index register, wherein the index register includes a plurality of flag bits and the first flag bit is associated with the first buffer; generating an interrupt indicating that one of the plurality of flag bits is asserted; reading the index register to determine which of the plurality of flag bits is asserted; deasserting the first flag bit; and outputting the input data from the first input buffer.

BRIEF DESCRIPTION OF THE DRAWINGS

A better understanding of the present invention will be apparent when the following detailed description of the preferred embodiment is considered in conjunction with the following drawings, in which.

Figure 1:
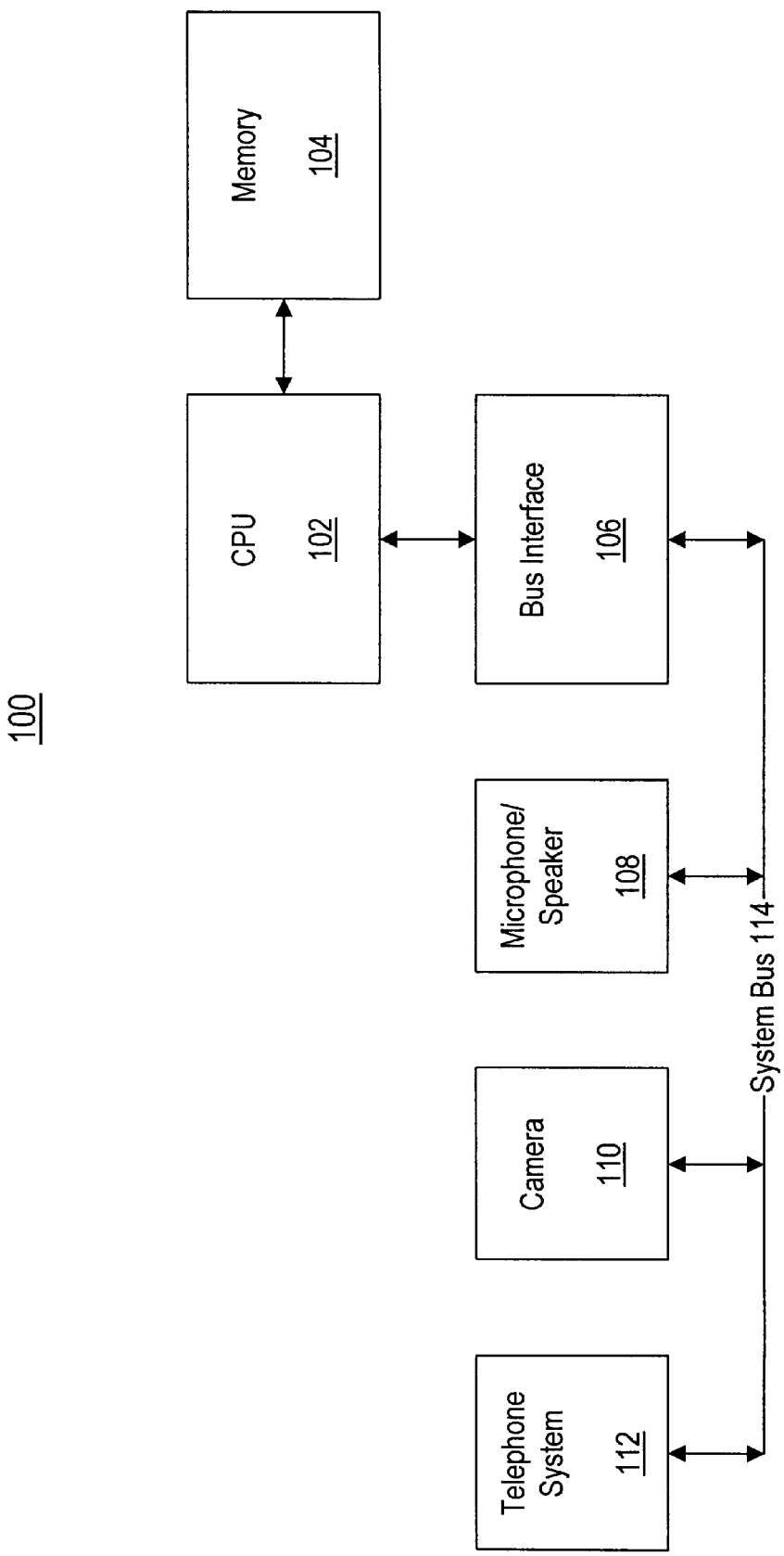
FIG. 1 is a block diagram of a computer system that interfaces a plurality of data devices to a processor via a system bus.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to FIG. 1, a block diagram of a computer system 100 that interfaces a plurality of data devices to processor via a system bus is shown. Computer system 100 includes a CPU core 102, a memory 104, a bus interface unit 106, a microphone/speaker 108, a camera 110, and a telephone system 112. Memory 104 is coupled to CPU 102. CPU 102 is coupled to bus interface 106. Bus interface 106, microphone/speaker 108, camera 110, and telephone system 112 are coupled to system bus 114.

The data devices (microphone/speaker 108, camera 110, and telephone system 112) communicate to CPU 102 and memory 104 via system bus 114 and bus interface 106. System bus 114 may be any conventional data transfer bus. For example, system bus 114 may be an Integrated Systems Architecture (ISA) bus or a PCI bus. In one embodiment, to transfer data from the data devices to the CPU, the data devices must first arbitrate for control of system bus 114. Arbitrating for system bus 114 requires a data device to assert a signal indicating that the data device desires to transmit or receive data on system bus 114. An arbitration circuit receives one or more signals indicating the data devices that desire to control the system bus and grants control to one of those devices. The selected data device then initiates a transaction on system bus 114. For example, if the data device desires to transmit data to the CPU, the data device initiates a bus cycle and asserts control signals indicating the destination device as bus interface 106. Bus interface 106 asserts an interrupt signal to CPU 102 indicating that a data device is attempting to convey data to CPU 102. The bus interface unit receives the data from the data device and transmits the data to CPU 102. CPU 102 may pass the data to memory 104 for storage.

The bandwidth of system bus 114 limits the number of data devices that may be interfaced to CPU 102. Additionally, a shared system bus may add significant overhead for arbitration and other protocol to the data transfer time on the bus. Still further, the interrupt latency requirement to read the data on system bus 114 may be more stringent than CPU 102 can meet. For example, if audio data is sampled from microphone/speaker 108 at 44.1 kHz stereo, and data is provided one sample at a time, CPU 102 is required to have an interrupt latency of less than 11 microseconds.

Figure 2:
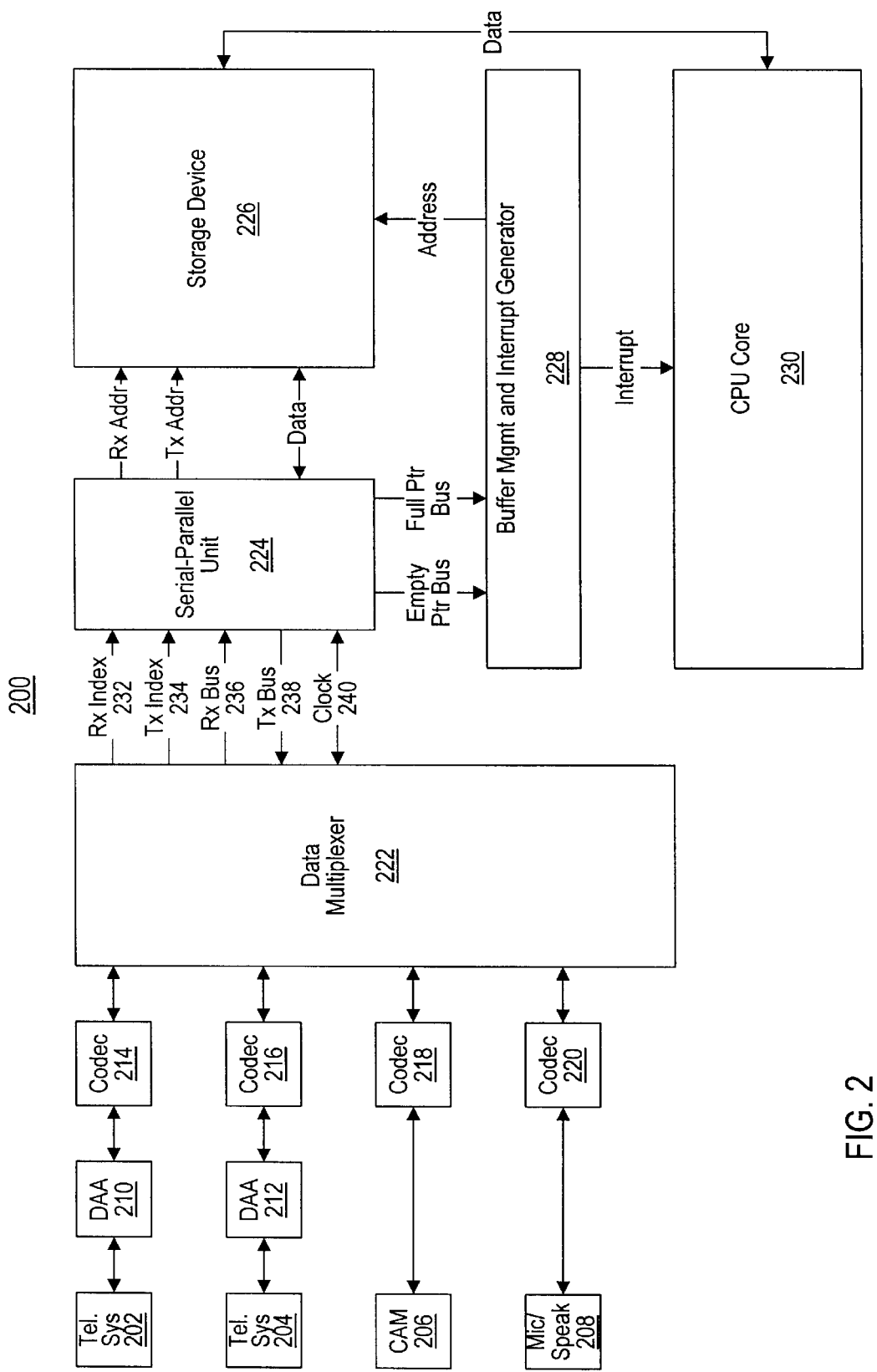
FIG. 2 is a block diagram of a serial data transfer mechanism in accordance with the present invention.

Turning now to FIG. 2, a serial data transfer system 200 according to the present invention is shown. System 200 includes a plurality of data devices: telephone system 202, telephone system 204, camera 206, and microphone/speaker 208. Codecs 214–220 interface the data devices to a data multiplexer 222. Data access arrangements (DAA) 210 and 212 are coupled between telephone systems 202 and 204 and CODECs 214 and 216. DAA's 210 and 212 provide signal isolation between the telephone systems and the CODECs. CODECs 214–220 are conventional CODECs that convert the data received from data devices 202–208 to serial data compatible with data multiplexer 222. In one embodiment, one or more CODECs convert analog data received from a data device to serial digital data.

Data multiplexer 222 is a conventional data multiplexer that interfaces to a plurality of serial data channels. Data multiplexer 222 receives a plurality of data streams from the data channels and combines the data streams into one output data stream referred to as a receive bus. The receive bus alternately outputs data received from the multiple data channels. A receive index indicates from which data channel the data on the receive bus was received. Additionally, data multiplexer 222 demultiplexes data received on a transmit bus to a plurality of data channels. Data multiplexer 222 is coupled to a control signal of each data device. The data devices assert the control signal to data multiplexer 222 to request transmit data. Data multiplexer 222 prioritizes the requests for data and outputs a transmit index indicating from which transmit buffer to provide data on the transmit bus.

Serial-parallel unit 224 generates addresses based upon the receive index and transmit index. Storage device 226 is organized into a plurality of receive buffers and transmit buffers. Each receive buffer and transmit buffer includes a plurality of data locations within storage device 226. Serial-parallel unit 224 generates an address of a data location within the receive buffer or transmit buffer identified by the receive or transmit index. In one embodiment, each receive buffer and transmit buffer have a full pointer and an empty pointer associated with the buffer. In one embodiment, the full buffer indicates the address of the last data location written to the buffer and the empty pointer indicates the address of the last data location read from the buffer. Serial-parallel unit 224 outputs the empty pointer for each receive buffer and transmit buffer on an empty pointer bus, and outputs the full pointer for each receive buffer and transmit buffer on a full pointer bus.

Serial-parallel unit 224 additionally converts the serial data from receive bus 232 to parallel data compatible with storage device 226. In one embodiment, storage device 226 is organized as data locations of 16 bits each. Accordingly, serial-parallel unit 224 converts the serial data received on serial bus 232 to 16-bit data words. In other embodiments, storage device 226 may be organized into data locations of a different width and serial-parallel unit 224 may convert the serial data to data words of a different width. Serial-parallel unit 224 also receives transmit data from storage device 226. Serial-parallel unit 224 converts the output data words to serial data which is transmitted on the transmit bus. In one embodiment, the data words from storage device 226 are 16 bits wide. Serial-parallel unit 224 converts the 16-bit wide data words to serial data.

Storage device 226, in a preferred embodiment is a random access memory (RAM) for storing receive and transmit data. In other embodiments, storage device 226 may be implemented using other types of storage devices. As discussed above, storage device 226 is organized into a plurality of receive buffers and transmit buffers. Each receive buffer and transmit buffer includes a plurality of data locations. In one embodiment, the receive buffers and transmit buffers are organized as a circular buffer. A circular buffer does not have a defined first address or last address. Instead, each buffer includes a full pointer and an empty pointer. The full pointer identifies the current top of the buffer and the empty pointer identifies the current bottom of the buffer. The number of data words stored in a buffer is equal to the value of the full pointer minus the value of the empty pointer. Each time a data word is written to a buffer, the full pointer is incremented. Each time a data word is output from a buffer, the empty pointer is incremented. In one embodiment, a buffer is empty when the empty pointer value minus the full pointer value is 0, and the buffer is full when the full pointer value minus the empty pointer value is equal to the maximum number of data words in the buffer. In other embodiments, the buffer may be organized in a different configuration. For example, the buffers may be organized as a pair of buffers. A first of the pair of buffers is configured to receive data while the second of the pair of buffers is configured to output data. When the buffer configured to receive data is full, the buffers are alternated such that the buffer that previously received data now outputs the stored data, and the buffer previously configured to output data now receives input data.

Buffer management and interrupt generator 228 receives the empty pointers and the full pointers for each buffer within storage device 226. When buffer management and interrupt generator 228 detects that a receive buffer is at a predetermined level of fullness or a transmit buffer is at a predefined level of emptiness, buffer management and interrupt generator 228 asserts a bit of an index register associated with that buffer. For example, buffer management and interrupt generator 228 may assert a bit of the index register when a receive buffer is half full or when a transmit buffer is half empty. In one embodiment, the index register includes one bit for each transmit buffer and each received buffer. Buffer management and index generator 228 further asserts an interrupt when a buffer is at the predefined level of fullness or emptiness.

When CPU core 230 receives an interrupt signal, it reads the index register of buffer management and interrupt generator 228 to determine which of the plurality of receive and transmit buffers of storage device 226 generated the interrupt. CPU core 230 deasserts the bit of the index register associated with the transmit or receive buffer that the CPU core will service. As noted above, if multiple bits of the index register are asserted, CPU core 230 determines which buffer to service using a priority scheme. The priority scheme may be simply the least recently serviced buffer, it may prioritize the buffers according to data rates, or any other conventional prioritization scheme. The deassertion of the bit in the index register causes buffer management 228 to assert address signals to read or write data from the appropriate buffer of storage device 226. After CPU core 230 has deasserted a bit of the index register, CPU core 230 prepares to receive data on the data bus from storage device 226 or to output data on the data bus to storage device 226.

Figure 3:
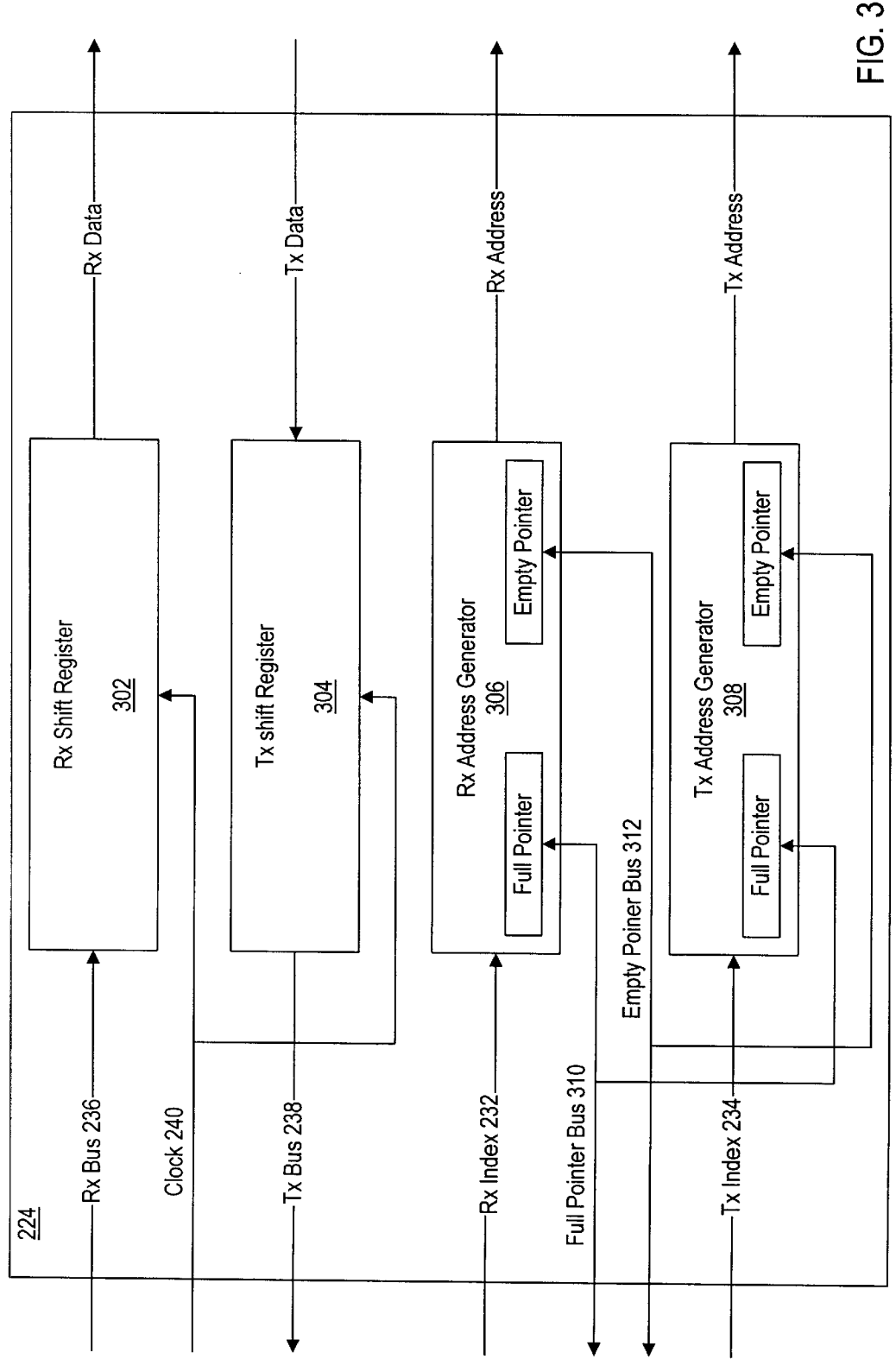
FIG. 3 is a block diagram of a serial-parallel unit in accordance with the present invention.

Referring now to FIG. 3, a block diagram of one embodiment of serial-parallel circuit 224 is shown. Serial-parallel unit 224 includes receive shift register 302, receive address generator 306, transmit shift register 304, transmit address generator 308, full pointer bus 310 and empty pointer bus 312. Referring first to the receive portion of serial-parallel unit 224, receive shift register 302 receives a serial stream of data from receive bus 236. Receive shift register 302 converts the serial data stream into parallel data words. The size of the data words is dependent upon the width of the data storage locations within storage device 226. For example, receive shift register 302 may convert the serial data into data words of 16 or 32 bits. In one embodiment, one bit of serial data is received each cycle of the clock signal received on clock signal line 240. In one embodiment, receive shift register 302 receives data at a receive input. The bits within receive shift register 302 are shifted one position each clock cycle. After all the bits of a data word have been shifted into receive shift register 302, the data word is output on a receive data signal line.

Receive index 232 is coupled to receive address generator 306. Receive index 232 indicates to which received buffer within storage device 226 the data on receive bus 236 is destined. Receive address generator 306 generates an address of a data location within storage device 226 from the receive index. Each receive buffer is allocated a portion of the data locations within storage device 226. Receive address generator 306 generates an address of a data location within the receive buffer identified by the receive index. Receive address generator 306 preferably generates an address of a data location to which data has not been written. In one embodiment, the data locations of each receive buffer have sequential addresses, and receive address generator 304 generates an address subsequent to the last address to which receive data was written to that receive buffer. In one particular embodiment, receive address generator 306 stores a full pointer and an empty pointer for each receive buffer. The full pointer stores the address of the last data word within a buffer to which data was stored. In an alternative embodiment, the full pointer may store the address of the next data word to be stored. In one embodiment, the empty pointer stores the address of the last data word output from the receive buffer. In one embodiment, the empty pointer is updated by buffer management 228 as data is read from the receive buffer by CPU core 230. Each time a data word is written to storage device 226, the full pointer of the receive buffer to which the data was written is incremented. When the full pointer points to the last data location allocated to a buffer, data words are stored beginning at the bottom of the buffer. The full pointers and the empty pointers are accessible via full pointer bus 310 and empty pointer bus 312.

The receive data output of receive shift register 302 and the receive address output of receive address generator 306 are coupled to storage device 226. Storage device 226 stores the receive data at the address specified by the receive address signal.

Referring now to the transmit portion of serial-parallel circuit 224, transmit shift register 304 receives a data word from storage device 226. The data word is stored in transmit shift register 304 and serially output on transmit bus 238. Transmit shift register 304 outputs one bit of the data word each clock cycle of a clock signal received on clock signal line 240. The data received by transmit shift register 304 is output by storage device 226 from an address specified by transmit address generator 308.

Transmit address generator 308 receives a transmit index which identifies from which transmit buffer the output data on transmit bus 238 is to be read. Each transmit buffer includes a plurality of data locations. Transmit address generator 308 generates an address within the address space of the data locations allocated to the transmit buffer identified by the transmit index. In one embodiment, the data locations of the transmit buffer have sequential addresses, and transmit address generator 308 generates the address of a data location that precedes the last data location read from that transmit buffer.

Transmit generator 308 stores a full pointer and an empty pointer for each transmit buffer within storage device 226. The empty pointer stores an address of the last data word output from a transmit buffer. In an alternative embodiment, the empty pointer may point to the next data word to be output from the transmit buffer. Each time a data word is output from the transmit buffer, the address stored in the empty pointer is incremented. In one embodiment, the full pointer is incremented by buffer management 228 when data is loaded from the CPU core to the transmit buffer. The empty pointer and full pointer are accessible on empty pointer bus 312 and full pointer bus 310.

Figure 4:
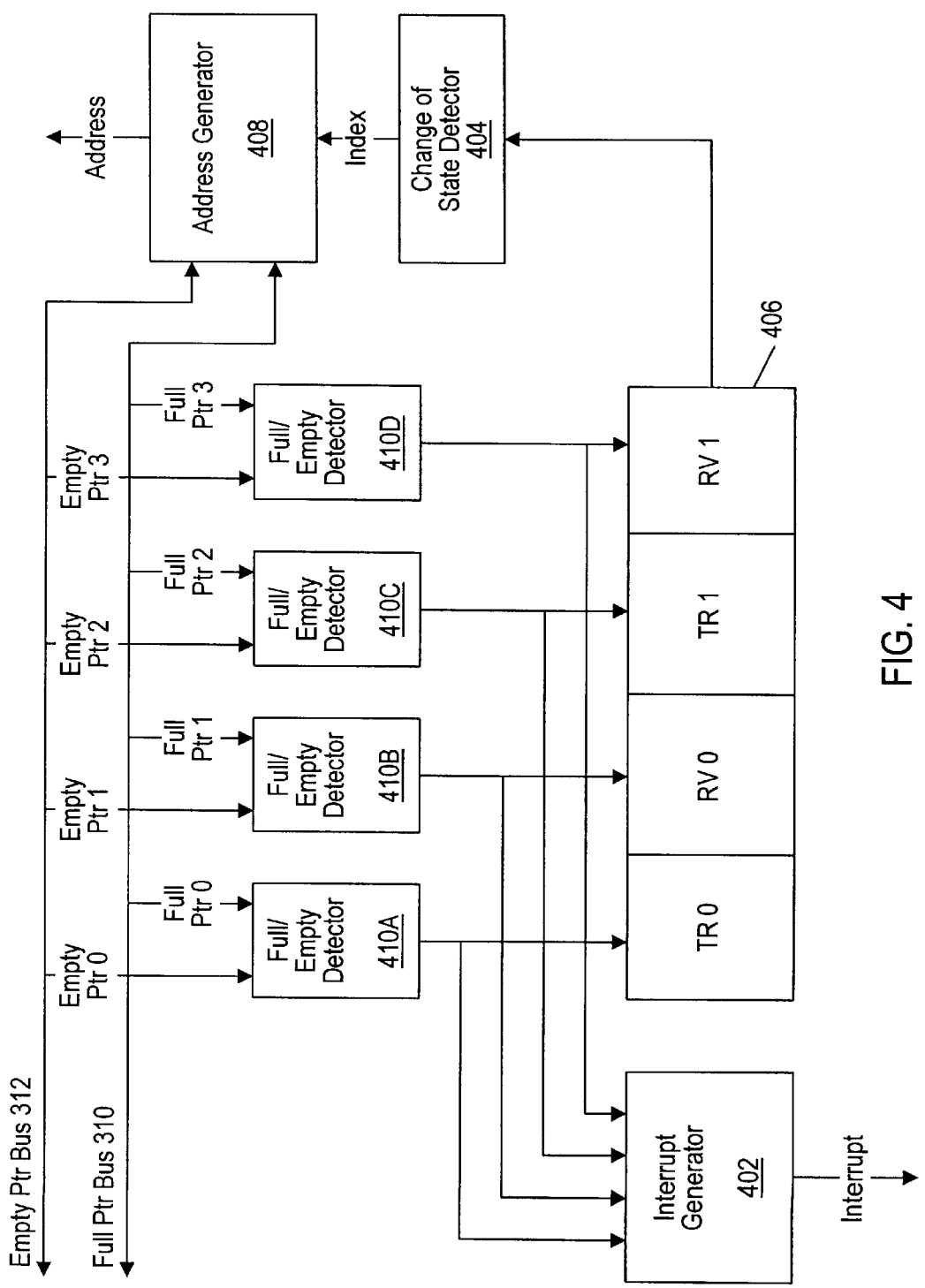
FIG. 4 is a block diagram of a buffer management circuit and interrupt generator in accordance with the present invention.

Turning now to FIG. 4, a block diagram of one embodiment of buffer management and interrupt generator 228 is shown. Buffer management and interrupt generator 228 includes interrupt generator 402, change of state detector 404, index register 406, address generator 408, and full/empty detectors 410A–410D. Buffer management and interrupt generator 228 includes a plurality of full/empty detectors 410. Each full/empty detector is coupled to an empty pointer and a full pointer of a receive or transmit buffer. The empty pointers and the full pointers are received from serial-parallel unit 224 via full pointer bus 310 and empty pointer bus 312. Each full/empty detector compares a full pointer to an empty pointer to determine the level of fullness or emptiness of a buffer. When a full/empty detector 410 determines the level of fullness or emptiness of a buffer meets the predetermined level for that buffer, an output of the full/empty detector 410 coupled to index register 406 asserts a bit within index register 406 associated with that full/empty detector. The outputs of full/empty detector 410 are also coupled to interrupt generator 402. Interrupt generator 402 asserts an interrupt signal when full/empty detectors 410 assert a bit within index register 406. Accordingly, when a full/empty detector 410 determines a buffer is at a predefined level of emptiness or fullness, the full/empty detector asserts a bit within index register 406 and interrupt generator 402 generates an interrupt.

As discussed above, when CPU core 230 receives an interrupt from buffer management and interrupt generator 228, an interrupt service routine causes CPU core 230 to read index register 406. The bits of index register 406 indicate empty transmit buffers and full receive buffers. If only one bit of index register 406 is asserted, CPU core 230 deasserts that bit. Alternatively, if multiple bits of index register 406 are asserted, CPU core 230 deasserts one of the plurality of asserted bits. The deassertion of a bit of index register 406 indicates that CPU core 230 will service the buffer associated with that bit. If the buffer is a received buffer, servicing the buffer involves reading data from the received buffer. If the buffer is a transmit buffer, servicing the buffer involves writing data to the transmit buffer.

Change of state detector 404 detects the deassertion of bits within index register 406. When change of state detector 404 detects the deassertion of a bit within index register 406, change of state detector 404 outputs an index signal indicative of which buffer CPU core 230 is servicing. Address generator 408 receives the index signal from change of state detector 404. Address generator 408 generates an address of a data location within the buffer being serviced by CPU 230.

Address generator 408 has access to the full pointers and empty pointers of serial-parallel unit 224. In one embodiment, if change of state detector 404 identifies a transmit buffer, address generator 408 outputs the address of the full pointer for the transmit buffer identified by change of state detector 404. Address generator 408 also increments the value of the full pointer for the transmit buffer. In an alternative embodiment, address generator 408 conveys a signal to serial-parallel unit 224 which indicates that the full pointer should be incremented. In one embodiment, if the buffer identified by change of state detector 404 is a receive buffer, address generator 408 outputs the address value of the empty pointer of that buffer, and increments the value of the empty pointer.

For example, full/empty detector 410A is coupled to a full pointer and empty pointer of transmit buffer 0. Full/empty detector 410A compares the full pointer to the empty pointer to determine the number of data words stored in transmit buffer zero. When the empty pointer equals the full pointer, the transmit buffer is empty. Full/empty detector 410A asserts the bit of index register 406 associated with transmit buffer zero (TR0) when the transmit buffer is a predefined level of emptiness. For example, if transmit buffer zero can store a maximum of 32 data words, full/empty detector 410A may assert bit TR0 of index register 406 when transmit buffer zero is half empty. In other words, when 16 data words remain in transmit buffer zero, or the empty pointer minus the full pointer is equal to 16, full/empty detector 410A asserts bit TR0 of index register 406. As noted above, when full/empty detector 410A asserts a bit in index register 406, interrupt generator 402 concurrently generates an interrupt recieved by CPU core 230. Upon receipt of an interrupt, CPU core 230 reads index register 406 and deasserts bit TR0 of index register 406. At this point, full/empty detector 410 changes the criteria for asserting bit TR0 in index register 406. Full/empty detector 410 reasserts bit TR0 of index register 406 until transmit buffer zero is full, or the full pointer minus the empty pointer equals 32. Each time CPU core 230 writes data to transmit buffer zero, CPU core 230 deasserts TR0. Full/empty detector 410A detects the deassertion and reasserts TR0, causing CPU core 230 to again write data to transmit buffer zero, until transmit buffer zero is full. After transmit buffer zero is full, full/empty detector 410A does not reassert TR0 until transmit buffer zero is half empty again.

In a similar manner to that discussed above for transmit buffer zero, full/empty generator 410B asserts an output signal when receive buffer zero achieves a predefined level of fullness. For example, full/empty detector 410B may assert an output signal when receive buffer zero is half full (if receive buffer 0 stores 32 data words, the receive buffer is half full when the full pointer minus the empty pointer equals 16). The assertion of an output signal by full/empty detector 410B causes interrupt generator 402 to generate an interrupt and asserts bit RV0 of index register 406. CPU core 230 reads the index register, deasserts bit RV0 and writes data to receive buffer zero. Full/empty detector 410B continues to reassert bit RV0 after CPU core 230 has deasserted bit RV0 until receive buffer zero is empty, i.e., the empty pointer equals the full pointer.

Figure 5:
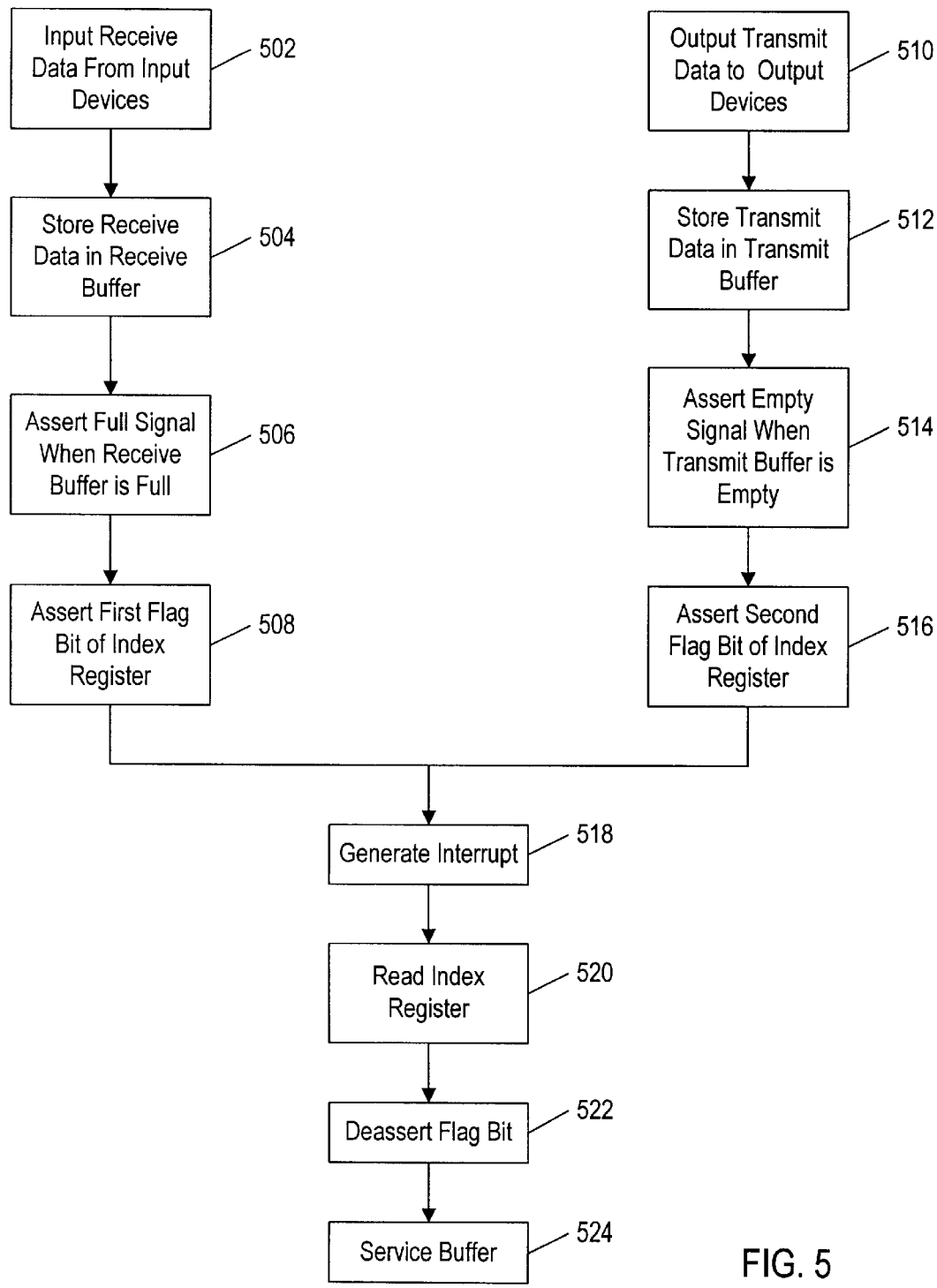
FIG. 5 is a flow chart diagram of a method for transferring data from a plurality of data devices to a CPU core.

Turning now to FIG. 5, a flow chart diagram of a method for transferring data from a plurality of data devices to the CPU core is shown. In step 502, receive data is input from a plurality of input devices. In step 504, the receive data is stored in a plurality of receive buffers. In step 506, a full signal is asserted when one of the plurality of receive buffers is full. In step 508, a first flag bit of a plurality of flag bits of an index register is asserted. In step 510, transmit data is output to a plurality of output devices. In step 512, transmit data is stored in a plurality of transmit buffers. In step 514, an empty signal is asserted when one of the plurality of transmit buffers is empty. In step 516, a second flag bit of the index register is asserted. In one embodiment, steps 502–508 are performed concurrently with steps 510–516.

In step 518, an interrupt is generated when one of the plurality of flag bits of the index register is asserted. In step 520, a microprocessor core receives the interrupt signal and reads the index register to determine which of the plurality of transmit buffers and receive buffers generated the interrupt. In step 522, the processor deasserts one of the plurality of flag bits of the index register. If only one flag bit of the index register is asserted, then the microprocessor core deasserts that flag bit. If, however, a plurality of flag bits are asserted, then the microprocessor core prioritizes the asserted flag bits and deasserts one of the plurality of flag bits. In step 524, the buffer associated with the deasserted flag bit is serviced. If the buffer associated with the deasserted flag bit is a receive buffer, the microprocessor core downloads the receive data stored in receive buffer. If the deasserted flag bit is associated with a transmit buffer, the microprocessor core uploads transmit data to the transmit buffer.

What is claimed is:

1. A data transfer system comprising:
a buffer configured to be coupled to a first input device wherein said buffer includes a first data buffer configured to store receive data from said first input device, and said first data buffer includes a first signal configured to indicate a level of fullness of said first data buffer;

a serial-parallel unit coupled between said buffer and said first input device, wherein said serial-parallel unit is configured to receive data from said first input device in a serial format over a dedicated serial bus, wherein said serial-parallel unit is further configured to provide data to said buffer in a parallel format, wherein said dedicated serial bus includes a clock line, one or more receive index lines, and a serial receive bus;

a buffer management circuit coupled to said buffer, wherein said buffer management circuit includes an index register that includes a first flag bit, and said buffer management circuit is configured to assert said first flag bit and to assert an interrupt signal when said first signal indicates said first buffer is at a predefined level of fullness;

a microprocessor core coupled to said buffer management circuit and to said buffer, wherein said microprocessor core is configured to receive said interrupt signal, to read said index register, to deassert said first flag bit, and to input said receive data stored in said first data buffer;

wherein said buffer management circuit is configured to provide an address signal and a control signal to said buffer in response to said deassertion of said first flag bit, and said address signal and said control signal are configured to cause said first data buffer to output said receive data stored in said first data buffer.

2. The data transfer system of claim 1 wherein said buffer management circuit is configured to assert said first flag bit until said first data buffer is empty.

3. The data transfer system of claim 1 wherein said first data buffer further includes an empty pointer and a full pointer, and said first signal is configured to depend on the state of said full pointer and said empty pointer.

4. The data transfer system of claim 1 wherein:
said buffer is configured to be coupled to a second input device through said serial-parallel unit;
said buffer includes a second data buffer configured to store receive data from said second input device over said dedicated serial bus, and said second data buffer includes a second signal configured to indicate a level of fullness of said second data buffer;

said index register includes a second flag bit, wherein said buffer management circuit is configured to assert said second flag bit and to assert said interrupt signal when said second signal indicates said second buffer is at a predefined level of fullness;

said microprocessor core is configured to receive said interrupt signal, to read said index register, to deassert said second flag bit, and to input said receive data stored in said second data buffer; and said buffer management circuit is configured to provide said address signal and said control signal to said buffer in response to said deassertion of said second flag bit, and said address signal and said control signal are configured to cause said second data buffer to output said receive data stored in said second data buffer.

5. The data transfer system of claim 1 wherein:

said buffer is configured to be coupled to an output device through said serial-parallel unit;

said serial-parallel unit is configured to receive data from said buffer in said parallel format, said serial-parallel unit is further configured to transmit data to said output device over said dedicated serial bus in said serial format, and said dedicated serial bus further includes one or more transmit index lines and a serial transmit bus;

said buffer includes a second data buffer configured to store transmit data for said output device for transmission over said dedicated serial bus, and said second data buffer includes a second signal configured to indicate a level of emptiness of said second data buffer;

said index register includes a second flag bit, said buffer management circuit is configured to assert said second flag bit and to assert said interrupt signal when said second signal indicates said second buffer is at a predefined level of emptiness;

said microprocessor core is configured to receive said interrupt signal, to read said index register, to deassert said second flag bit, and to output said transmit data to said second data buffer;

said buffer management circuit provides said address signal and said control signal to said buffer in response to said deassertion of said second flag bit, and said address signal and said control signal are configured to cause said second data buffer to receive said transmit data from said microprocessor core.

6. The data transfer system of claim 5 further comprising an input/output device wherein said input/output device is configured to provide said receive data to said first data buffer and to output said transmit data from said second data buffer concurrently.

7. The data transfer system of claim 1 further comprising a plurality of input/output devices, and a multiplexer coupled between said plurality of input/output devices and said buffer, wherein said buffer includes a plurality of data buffers and said multiplexer is configured to alternately route data from one of said plurality of input/output devices to one of said plurality of data buffers over said serial receive bus of said dedicated serial bus, to alternately route data from said one of said plurality of data buffers to said one of said plurality of input/output devices over said serial transmit bus of said dedicated serial bus, and to output an index signal indicating the device to which data is being input and output over either said one or more receive index lines or said one or more transmit index lines of said dedicated serial bus.

8. The data transfer system of claim 1 wherein said index register includes a plurality of flag bits, each of said flag bits is associated with one of said data buffers and said flag bits are configured to be asserted when said associated data buffers are at a predefined level of fullness.

9. The data transfer system of claim 7, further comprising:

one or more CODECS coupled between a respective one of said plurality of external devices and said multiplexer, wherein said one or more CODECS are configured to convert data received said respective one of said plurality of external devices into serial data compatible with said multiplexer.

10. The data transfer system of claim 7 wherein said data multiplexer is configured to accept serial data from a first one of said plurality of external devices concurrently with transmitting serial data to a second one of said plurality of external devices.

11. A microprocessor comprising:

a serial-parallel unit coupled to receive serial data over a dedicated receive bus and to transmit serial data over a dedicated transmit bus, wherein serial-parallel unit is configured to receive a receive index input and transmit a transmit index output, wherein said serial-parallel unit is further configured to convert said serial data to and from parallel data;

a storage device coupled to said serial-parallel unit, wherein said storage device is configured to accept receive data as said parallel data from said serial-parallel unit and to store said receive data, wherein said storage device includes a plurality of receive data buffers each configured to receive data from said serial-parallel unit and a plurality of transmit data buffers each configured to transmit data to said serial-parallel unit, and wherein said storage device includes a plurality of first signals each configured to indicate a level of fullness of a respective receive data buffer and a plurality of second signals each configured to indicate a level of fullness of a respective transmit data buffer;

a buffer management circuit coupled to said storage device, wherein said buffer management circuit includes an index register that includes a plurality of first flag bits, wherein said buffer management circuit is configured to assert a respective one of said plurality of first flag bits and to assert an associated receive interrupt signal when a respective one of said plurality of first signals indicates a respective one of said plurality of receive data buffers is at a predefined level of fullness, and wherein said index register further includes a plurality of second flag bits, wherein said buffer management circuit is configured to assert a respective one of said plurality of second flag bits and to assert an associated transmit interrupt signal when a respective one of said plurality of second signals indicates a respective one of said plurality of transmit data buffers is at a predefined level of fullness; and a microprocessor core coupled to said buffer management circuit and to said storage unit, wherein said microprocessor core is configured to receive said associated receive interrupt signal, to read said index register, to deassert said respective one of said plurality of first flag bits, and to input said receive data stored in said respective one of said plurality of receive data buffers, wherein said microprocessor core is further configured to receive said associated transmit interrupt signal, to read said index register, to deassert said respective one of said plurality of second flag bits, and to input said transmit data stored in said respective one of said plurality of transmit data buffers, wherein said microprocessor core is further configured to couple to a system bus;

wherein said buffer management circuit is configured to provide an address signal and a control signal to said storage device in response to said deassertion of said respective one of said plurality of first flag bits, and said address signal and said control signal are configured to cause said respective one of said plurality of receive data buffers to output said receive data stored in said respective one of said plurality of data buffers, and wherein said buffer management circuit is further configured to provide said address signal and said control signal to said storage device in response to said deassertion of said respective one of said plurality of second flag bits, and said address signal and said control signal are configured to cause said respective one of said plurality of transmit data buffers to output said transmit data stored in said respective one of said plurality of transmit data buffers.

12. The microprocessor of claim 11 wherein said buffer management circuit is configured to assert said respective one of said plurality of first flag bits until said respective receive data buffer is empty, and wherein said buffer management circuit is further configured to assert said respective one of said plurality of second flag bits until said respective transmit data buffer is empty.

13. The data transfer system of claim 11 wherein each of said respective receive data buffers further include an empty pointer and a full pointer, and said first signal is configured to depend on the state of said full pointer and said empty pointer in said each of said respective receive data buffers, and wherein each of said respective transmit data buffers further include said empty and said full pointer, and said second signal is configured to depend on the state of said full pointer and said empty pointer in said each of said respective transmit data buffers.

14. The microprocessor of claim 11 wherein said data translation unit is configured to be coupled to a data multiplexer via said dedicated receive bus and said dedicated transmit bus, wherein said data multiplexer is configured to accept serial data from and to transmit serial data to a plurality of external devices, and wherein said data multiplexer is configured to alternately route data from one of said plurality of external devices to one of said plurality of receive data buffers, to alternately route data from said one of said plurality of transmit data buffers to said one of said plurality of input/output devices, and to output an index signal indicating the external device to which data are being input and output.

* * * * *